United States Patent
Kang

(10) Patent No.: US 8,218,767 B2
(45) Date of Patent: Jul. 10, 2012

(54) SECURITY SYSTEM AND METHOD FOR USE IN NETWORK

(75) Inventor: Ki-Seok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 762 days.

(21) Appl. No.: 12/271,595

(22) Filed: Nov. 14, 2008

(65) Prior Publication Data

US 2009/0129589 A1 May 21, 2009

(30) Foreign Application Priority Data

Nov. 16, 2007 (KR) .................. 10-2007-0117189

(51) Int. Cl.
*H04L 9/00* (2006.01)
(52) U.S. Cl. ............. 380/260; 380/36; 380/42; 380/264
(58) Field of Classification Search .................. 380/264, 380/36, 42, 260
See application file for complete search history.

(56) References Cited

U.S. PATENT DOCUMENTS

| | | | | |
|---|---|---|---|---|
| 7,185,362 B2* | 2/2007 | Hawkes et al. | ................... | 726/4 |
| 7,224,803 B2* | 5/2007 | Cheng | ........................... | 380/277 |
| 7,237,108 B2* | 6/2007 | Medvinsky et al. | .......... | 713/160 |
| 7,325,134 B2* | 1/2008 | Fascenda | ...................... | 713/169 |
| 7,545,942 B2* | 6/2009 | Cohen et al. | .................. | 380/270 |
| 7,607,015 B2* | 10/2009 | Fascenda | ...................... | 713/171 |
| 7,751,565 B2* | 7/2010 | Yuen | .............................. | 380/255 |
| 2003/0095663 A1* | 5/2003 | Nelson et al. | ................ | 380/270 |
| 2003/0133572 A1* | 7/2003 | Fish et al. | ..................... | 380/232 |
| 2004/0005061 A1* | 1/2004 | Buer et al. | ..................... | 380/282 |
| 2008/0240420 A1* | 10/2008 | Oxford | .......................... | 380/28 |
| 2008/0298593 A1* | 12/2008 | Shen | ............................. | 380/278 |
| 2009/0129589 A1* | 5/2009 | Kang | ............................. | 380/42 |

OTHER PUBLICATIONS

D. Harkins et al., The Internet Key Exchange, The Internet Society, Network Working Group, Request for Comments: 2409, Category: Standards Track, Nov. 1998.

* cited by examiner

*Primary Examiner* — Krisna Lim
(74) *Attorney, Agent, or Firm* — Jefferson IP Law, LLP

(57) ABSTRACT

A security system, method and device for use in a network for providing a real-time stream are provided. A server updates security association of a terminal device by periodically providing a key stream. When the key stream for changing the security association of the terminal device is received from the server, the terminal device updates stored key stream information after identifying at least one changed field in the key stream and performs a security policy with the server using the updated key stream information. When a security setting operation is performed through a stream notification periodically provided from the server, an unnecessary waste of system resources can be reduced by updating only a specific changed field through the stream notification and reducing the load of generating a security association table.

20 Claims, 5 Drawing Sheets

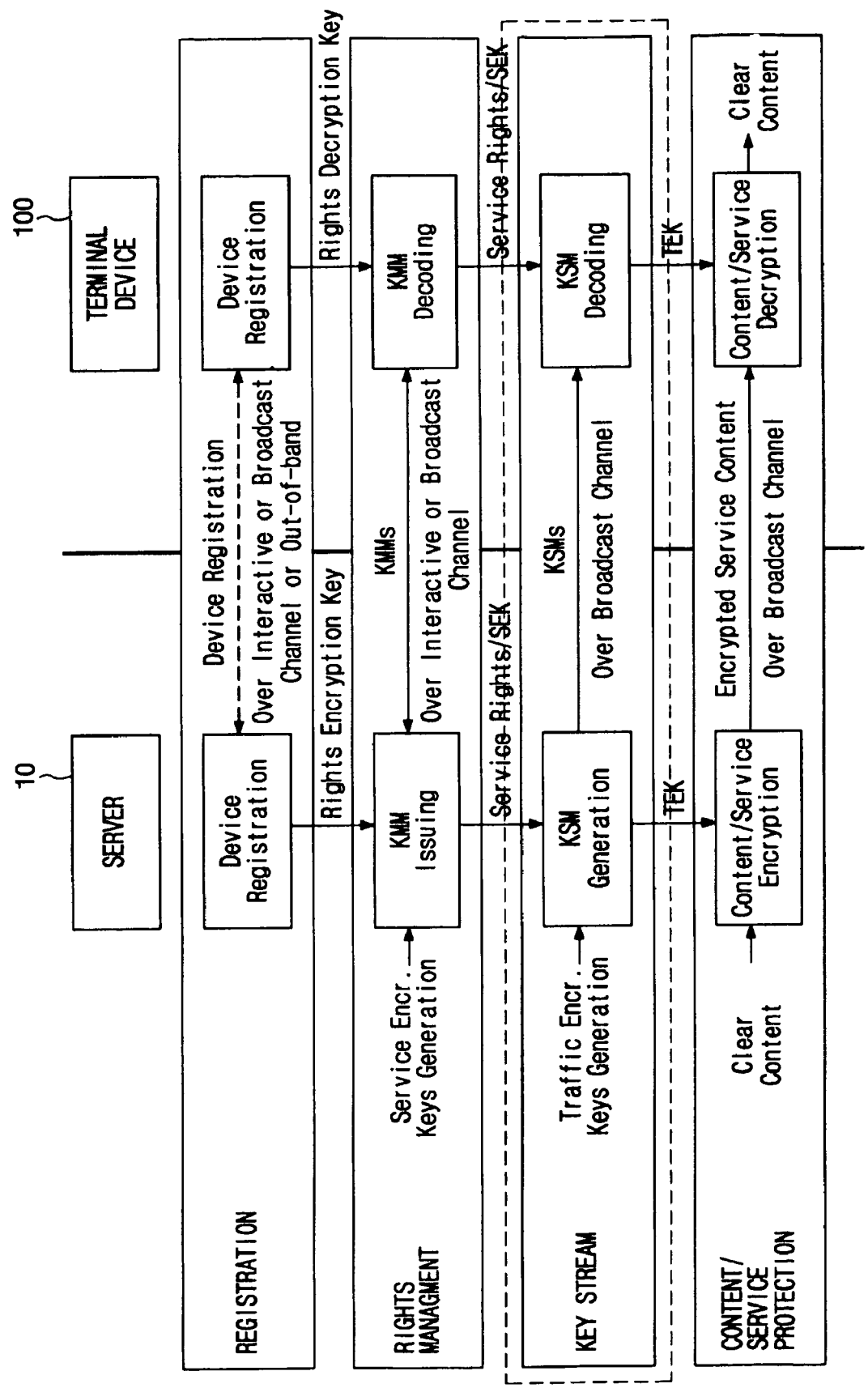

FIG. 4

| Short_Term_Key_Message_Description | Length | Type |
|---|---|---|
| short_term_key_message() { | | |
|   selectors_and_flags { | | |
|     protocol_version | 4 | uimsbf |
|     protection_after_reception | 2 | uimsbf |
|     reserved_for_future_use | 1 | bslbf |
|     access_criteria_flag | 1 | uimsbf |
|     traffic_protection_protocol | 3 | uimsbf |
|     traffic_authentication_flag | 1 | uimsbf |
|     next_traffic_key_flag | 1 | uimsbf |
|     timestamp_flag | 1 | uimsbf |
|     programme_flag | 1 | uimsbf |
|     service_flag | 1 | uimsbf |
|   } | | |
|   if (traffic_protection_protocol == TKM_ALGO_IPSEC) { | | |
|     security_parameter_index | 32 | uimsbf |
|     if (next_traffic_key_flag == KSM_FLAG_TRUE ) { | | |
|       next_security_parameter_index | 32 | uimsb |
|     } | | |
|   } | | |
|   encrypted_traffic_key_material_length | 8 | uimsbf |
|   encrypted_traffic_key_material | 8*encrypted_traffic_key_material_length | bslbf |
|   if (next_traffic_key_flag == TKM_FLAG_TRUE) { | | |
|     next_encrypted_traffic_key_material | 8*encrypted_traffic_key_material_length | bslbf |
|   } | | |
|   reserved_for_future_use | 4 | bslbf |
|   traffic_key_lifetime | 4 | uimsbf |
|   if (timestamp_flag == TKM_FLAG_TRUE) { | | |
|     Timestamp | 40 | mjdutc |
|   } | | |
|   if (access_criteria_flag == TKM_FLAG_TRUE) { | | |
|     reserved_for_future_use | 8 | bslbf |
|     number_of_access_criteria_descriptors | 8 | uimsbf |
|     access_criteria_descriptor_loop() { | | |
|       access_criteria_descriptor() | | |
|     } | | |
|   } | | |
|   if (programme_flag == TKM_FLAG_TRUE) { | | |
|     programme_selectors_and_flags { | | |
|       reserved_for_future_use | 7 | bslbf |
|       permissions_flag | 1 | uimsbf |
|     } | | |
|     if (permissions_flag == TKM_FLAG_TRUE) { | | |
|       permissions_category | 8 | uimsbf |
|     } | | |
|     if (service_flag == TKM_FLAG_TRUE) { | | |
|       encrypted_PEK | 128 | bslbf |
|     } | | |
|     programme_CID_extension | 32 | uimsbf |
|     programme_MAC | 96 | bslbf |
|   } | | |
|   if (service_flag == TKM_FLAG_TRUE) { | | |
|     service_CID_extension | 32 | uimsbf |
|     service_MAC | 96 | bslbf |
|   } | | |
| } | | |

SECURITY SYSTEM AND METHOD FOR USE IN NETWORK

PRIORITY

This application claims the benefit under 35 U.S.C. §119 (a) of a Korean patent application filed on Nov. 16, 2007 and assigned Serial No. 10-2007-0117189, the entire disclosure of which is hereby incorporated by reference.

BACKGROUND OF THE INVENTION

1. Field of the Invention

The present invention relates to a security system and method for use in a network. More particularly, the present invention relates to a security system and method for use in a network for providing a real-time stream that can provide an Internet Protocol security (IPsec) algorithm for service & content protection between a server and receiver terminals for IP-based data streaming services, Convergence of Broadcast and Mobile Services (CBMS), Open Air Interface (OAI), and mobile BroadCAST services enabler suite (BCAST) in Digital Video Broadcasting for Handheld (DVB-H) serving as an European IP DataCast (IPDC) standard.

2. Description of the Related Art

IPsec is a protocol for connecting a remote host and a network using a security tunnel on a public network such as the Internet.

In order to safely connect a system between hosts or networks, Internet Key Exchange (IKE) protocol, implemented by the Internet Engineering Task Force (IETF), is used for mutual authentication.

An IPsec connection is divided into two logical phases as illustrated in FIG. 1.

FIG. 1 is a signal flow diagram illustrating a security processing operation in a conventional network for providing a real-time stream.

Referring to FIG. 1, in the first phase (Phase 1), a terminal or responder 20 initializes a connection with an IPsec server or initiator 10.

The initiator 10 then exchanges a cipher, mode information, and a Diffie-Hellman public value to be used through IKE/IKE version 2 (IKEv2) protocol, which serves as a key management protocol for key encryption, after reading security information of the responder requesting the connection.

In the second phase (Phase 2), Security Association (SA) is established for bidirectional authentication between IPsec connection nodes.

Next, an SA database containing setting information of a secret session-key exchange parameter and cryptography is organized. In practice, the IPsec connection between the responder 20 and the initiator 10 is managed. After the IPsec connection is established in the above-described phases, data can be securely transmitted and received.

However, in order to maintain a high-level security in DVB-H CBMS, OAI, and BCAST services and data streaming services, the SA is frequently varied.

Since a data distributor server performs an IPsec encryption operation for content & service in real time, the SA is negotiated in a new IPsec connection.

The first phase is achieved by a pre-negotiation procedure without use of the IKE. In the CBMS specification based on DVB-H, a key is managed in a Conditional Access System (CAS) solution or Digital Rights Management (DRM) profile. In the OAI specification, a key is managed in a DRM profile.

In the second phase, the SA of the responder 20 is updated by a periodic stream notification of the initiator 10.

Even when a key part length and value are varied in the SA, the responder 20 continuously generates and deletes the SA, which is inefficient and necessitates management of SA resources.

Synchronization of SA to be used for a content stream received in real time and SA to be generated in real time is needed. If no optimum synchronization method is provided, resources may be wasted by checking all generated SAs.

SUMMARY OF THE INVENTION

An aspect of the present invention is to address at least the above-mentioned problems and/or disadvantages and to provide at least the advantages described below. Accordingly, an aspect of the present invention is to provide a security system and method for use in a network for providing a real-time stream that can reduce an unnecessary waste of system resources by updating only a specific changed field through a stream notification, and for reducing the load of generating a security association table when a security setting operation is performed through the stream notification periodically provided from a server.

In accordance with an aspect of the present invention, a security system for use in a network for providing a real-time stream is provided. The system includes a server for updating a security association of a terminal device by periodically providing a key stream, and the terminal device for updating stored key stream information after identifying at least one changed field in the key stream for changing the security association of the terminal device when the key stream is received from the server, and for performing a security policy with the server using the updated key stream information.

The terminal device may include a storage for storing at least one key stream information element, a security association determiner for determining whether at least one changed field is included among one or more key stream fields when the key stream for updating the security association of the terminal device is received from the server, and a security association updater for updating the at least one changed field in key stream information stored in the storage when the at least one changed field is identified in the key stream through the security association determiner.

The security association updater may update only the at least one changed field in key stream information stored in the storage when the at least one changed field is identified in the key stream through the security association determiner. The security association updater may sequentially update the key stream information stored in the storage. The storage may store three key stream information elements. The key stream may be received in one or more User Datagram Protocol (UDP) packets. The at least one changed field may include at least one of a security_parameter_index, a next_security_parameter_index, an encrypted_traffic_key_material_length, an encrypted_traffic_key_material, and a traffic_key_lifetime.

In accordance with another aspect of the present invention, a security method for use in a network for providing a real-time stream is provided. The method includes determining whether at least one changed field is included in a key stream for updating a security association of the terminal device when a terminal device receives the key stream from a server, identifying the at least one changed field among one or more key stream fields, and updating the at least one changed field in stored key stream information.

The updating may update only the at least one changed field in the stored key stream information. The updating may include sequentially updating at least one stored key stream information element. The updating may further include sequentially updating three key stream information elements. The key stream may be received in one or more User Datagram Protocol (UDP) packets. The at least one changed field may include at least one of a security_parameter_index, a next_security_parameter_index, an encrypted_traffic_key_material_length, an encrypted_traffic_key_material, and a traffic_key_lifetime.

In accordance with yet another aspect of the present invention, a terminal device for use in a network for providing a real-time stream is provided The device includes a storage for storing at least one key stream information element, a security association determiner for determining whether at least one changed field is included among one or more key stream fields when the key stream for updating the security association of the terminal device is received from the server, and a security association updater for updating the at least one changed field in key stream information stored in the storage when the at least one changed field is identified in the key stream through the security association determiner.

The security association updater may update only the at least one changed field in key stream information stored in the storage when the at least one changed field is identified in the key stream through the security association determiner. The security association updater may sequentially update the key stream information stored in the storage. The storage may store three key stream information elements. The key stream may be received in one or more User Datagram Protocol (UDP) packets. The at least one changed field may include at least one of a security_parameter_index, a next_security_parameter_index, an encrypted_traffic_key_material_length, an encrypted_traffic_key_material, and a traffic_key_lifetime.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a security processing operation of a security system in a network for providing a real-time stream according to an exemplary embodiment of the present invention;

FIG. 4 is a table illustrating a key stream of a security system in a network for providing a real-time stream according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

A security system and method for use in a network for providing a real-time stream according to exemplary embodiments of the present invention will be described below with reference to the accompanying drawings.

Figure 1:
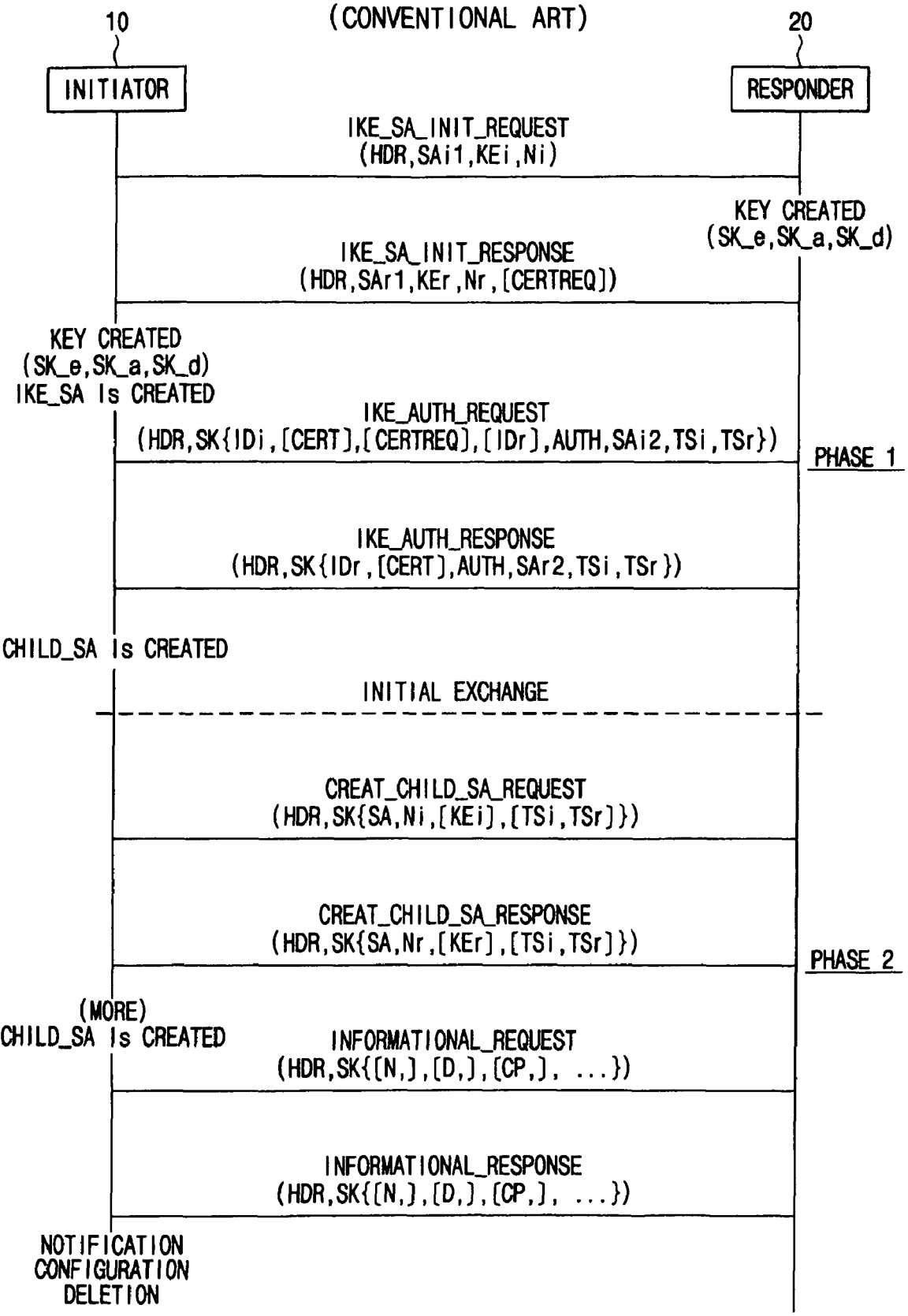
FIG. 1 is a signal flow diagram illustrating a security processing operation in a conventional network for providing a real-time stream.
Figure 2:
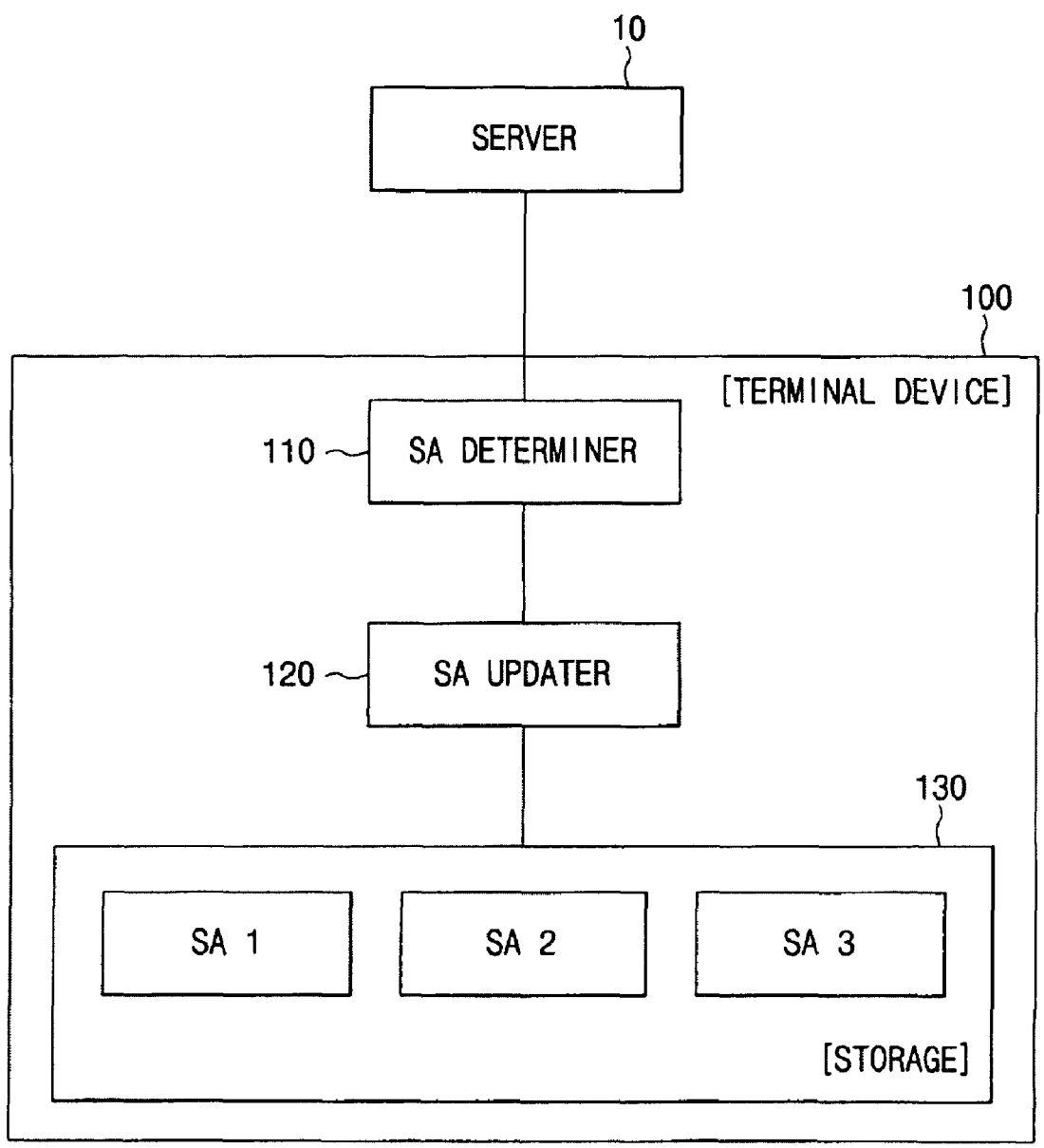
FIG. 2 is a functional block diagram illustrating a configuration of a security system for use in a network for providing a real-time stream according to an exemplary embodiment of the present invention.

FIG. 2 is a functional block diagram illustrating a configuration of a security system for use in a network for providing a real-time stream according to an exemplary embodiment of the present invention. The security system includes a server (head-end) 10 and a terminal device 100. The terminal device 100 includes an SA determiner 110, an SA updater 120, and a storage 130.

FIG. 3 illustrates a security processing operation of a security system in a network for providing a real-time stream according to an exemplary embodiment of the present invention.

After reading security information of the terminal device 100 requesting a connection, which is illustrated in FIG. 3, the server 10 exchanges a cipher, mode information, and a Diffie-Hellman public value to be used in IKE/IKEv2 protocol, which serves as a key management protocol for key encryption, with the terminal device 100.

Thereafter, the server 10 establishes SA for bidirectional authentication between IPsec connection nodes and sends SA information to the terminal device 100. Next, an SA database containing setting information of a secret session-key exchange parameter and cryptography is organized.

When receiving a key stream for changing the SA of the terminal device 100 from the server 10, the terminal device 100 identifies a changed field in the key stream, updates certain stored key stream information, and performs a security policy with the server 10 using the updated key stream information. Here, the key stream is transmitted in a User Datagram Protocol (UDP) packet.

The storage 130 of the terminal device 100 stores at least one key stream information element. The storage 130 stores three key stream information elements and can use at least four key stream information elements. A value for the lifetime could be three times the crypto period and a three-state machine is used.

When receiving a key stream for updating the SA of the terminal device 100 from the server 10, the SA determiner 110 of the terminal device 100 determines whether a changed field is included among key stream fields.

When identifying the changed field in the key stream through the SA determiner 110, the SA updater 120 of the terminal device 100 updates only the changed field in certain key stream information stored in the storage 130.

The SA updater 120 sequentially updates the key stream information stored in the storage 130.

Descriptions of the conventional functions and operations of the above-described components are omitted and only the operations directly related to the exemplary embodiment of present invention are described herein.

After reading security information of the terminal device 100 requesting a connection, the server 10 exchanges a cipher, mode information, and a Diffie-Hellman public value to be used in IKE/IKEv2 protocol, which serves as a key management protocol for key encryption, with the terminal device 100.

Thereafter, the server 10 establishes SA for bidirectional authentication between IPsec connection nodes and sends SA information to the terminal device 100. Next, an SA database containing setting information of a secret session-key exchange parameter and cryptography is organized.

The terminal device 100 stores at least one key stream information element SA1. In an exemplary implementation, the storage 130 stores three key stream information elements SA1, SA2, and SA3 and can use at least four key stream information elements. A value for the lifetime could be three times the crypto period and a three-state machine is used.

When no key stream information is stored, the terminal device 100 generates the key stream information SA1 to be stored in the storage 130 through a key stream received from the server 10.

The terminal device 100 sends a response message to the server 10 after retrieving the generated key stream information, thereby establishing IPsec security with the server 10.

When a real-time content stream is provided, the server 10 sends a key stream to be synchronized with the content stream to the terminal device 100.

The server 10 sends the synchronized key stream to the terminal device 100. In the key stream, which is shown in FIG. 4, only a specific field can be changed.

FIG. 4 is a table illustrating a key stream of a security system in a network for providing a real-time stream according to an exemplary embodiment of the present invention.

After generating a key stream by changing at least one of a security_parameter_index, a next_security_parameter_index, an encrypted_traffic_key_material_length, an encrypted_traffic_key_material, and a traffic_key_lifetime, the key stream is sent to the terminal device 100.

When the terminal device 100 receives the key stream from the server 10, the SA determiner 110 determines whether a changed field is included among one or more key stream fields.

When the changed field is included among the key stream fields, the SA updater 120 of the terminal device 100 updates only the changed field in the next key stream information SA2 stored in the storage 130. When there is no key stream information SA2, the key stream information SA2 is generated and stored.

When the terminal device 100 receives another key stream from the server 10, the SA determiner 110 determines whether a changed field is included among key stream fields.

When the changed field is identified in the key stream through the SA determiner 110, the SA updater 120 of the terminal device 100 updates only the changed field in the key stream information SA3 stored in the storage 130.

Thereafter, when another key stream is received from the server 10, the SA determiner 110 of the terminal device 100 determines whether a changed field is included among one or more key stream fields.

When the changed field is identified in the key stream through the SA determiner 110, the SA updater 120 of the terminal device 100 updates only the changed field in the key stream information SA1 stored in the storage 130.

When the SA updater 120 updates the key stream information stored in the storage 130 through the key stream received from the server 10, the stored key stream information SA1 is updated without generating additional key stream information.

When a security policy of a content stream is performed, the terminal device 100 performs an IPsec procedure with the server 10 through the stored key stream information SA1.

Next, a security method for use in the network for providing a real-time stream according to an exemplary embodiment of the present invention will be described with reference to FIG. 5.

Figure 5:
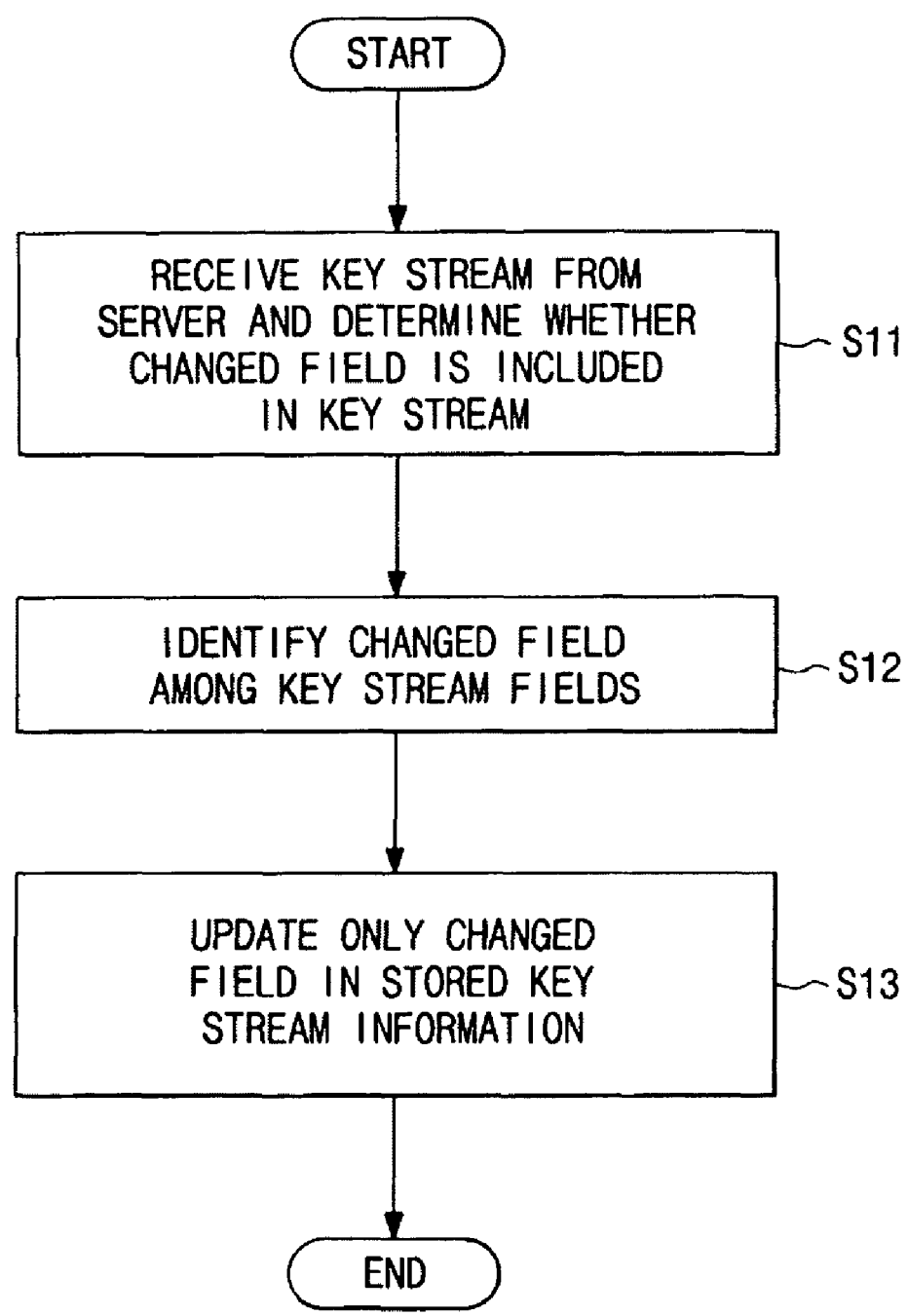
FIG. 5 is a flowchart illustrating a security method in a network for providing a real-time stream according to an exemplary embodiment of the present invention.

FIG. 5 is a flowchart illustrating a security method in a network for providing a real-time stream according to an exemplary embodiment of the present invention.

After reading security information of the terminal device 100 requesting a connection, the server 10 exchanges a cipher, mode information, and a Diffie-Hellman public value to be used in IKE/IKEv2 protocol, which serves as a key management protocol for key encryption, with the terminal device 100.

Thereafter, the server 10 establishes SA for bidirectional authentication between IPsec connection nodes and sends SA information to the terminal device 100. At this time, an SA database containing setting information of a secret session-key exchange parameter and cryptography is organized.

When receiving a key stream for changing the SA of the terminal device 100 from the server 10, the terminal device 100 determines whether there is a changed field in the key stream in step S11.

The changed field is identified among key stream fields in step S12.

Only the changed field is updated in stored key stream information in step S13. In step S13, at least one stored key stream information element is sequentially updated. For example, three key stream information elements can be sequentially updated.

According to a security system and method for use in a network for providing a real-time stream according to exemplary embodiments of the present invention, unnecessary waste of system resources can be reduced by updating only a specific changed field through a stream notification and reducing the load of generating a security association table when a security setting operation is performed through the stream notification periodically provided from a server.

While the invention has been shown and described with reference to certain exemplary embodiments thereof, it will be understood by those skilled in the art that various changes in form and details may be made without departing from the spirit and scope of the present invention as defined by the appended claims and their equivalents. Therefore, the present invention is not limited to the above-described exemplary embodiments, but is defined by the following claims, along with their full scope of equivalents.

What is claimed is:

1. A security system for use in a network for providing a real-time stream, the system comprising:
    a server for updating a security association of a terminal device by periodically providing a key stream; and
    the terminal device for updating stored key stream information and for performing a security policy with the server using the updated key stream information, comprising a security association determiner for determining whether at least one changed field is included among one or more key stream fields when the key stream for updating the security association of the terminal device is received from the server, wherein, if the at least one changed field is determined to be included among the one or more key stream fields, then the terminal device updates the stored key stream information after identifying the at least one changed field in the key stream for changing the security association of the terminal device when the key stream is received from the server.

2. The system of claim 1, wherein the terminal device comprises:
   a storage for storing at least one key stream information element; and
   a security association updater for updating the at least one changed field in key stream information stored in the storage when the at least one changed field is identified in the key stream through the security association determiner.

3. The system of claim 2, wherein the security association updater updates only the at least one changed field in the key stream information stored in the storage when the at least one changed field is identified in the key stream through the security association determiner.

4. The system of claim 2, wherein the security association updater sequentially updates the key stream information stored in the storage.

5. The system of claim 4, wherein the storage stores three key stream information elements.

6. The system of claim 1, wherein the key stream is received in one or more User Datagram Protocol (UDP) packets.

7. The system of claim 1, wherein the at least one changed field comprises at least one of a security_parameter_index, a next_security_parameter_index, an encrypted_traffic_key_material_length, an encrypted_traffic_key_material, and a traffic_key_lifetime.

8. A security method for use in a network for providing a real-time stream, the method comprising:
   determining whether at least one changed field is included in a key stream for updating a security association of the terminal device when a terminal device receives the key stream from a server;
   identifying the at least one changed field among one or more key stream fields; and
   updating the at least one changed field in stored key stream information.

9. The method of claim 8, wherein the updating of the at least one changed field in the stored key stream information includes updating only the at least one changed field in the stored key stream information.

10. The method of claim 8, wherein the updating of the at least one changed field in the stored key stream information includes sequentially updating at least one stored key stream information element.

11. The method of claim 10, wherein the updating of the at least one changed field in stored key stream information further includes sequentially updating three key stream information elements.

12. The method of claim 8, wherein the key stream is received in one or more User Datagram Protocol (UDP) packets.

13. The method of claim 8, wherein the at least one changed field comprises at least one of a security_parameter_index, a next_security_parameter_index, an encrypted_traffic_key_material_length, an encrypted_traffic_key_material, and a traffic_key_lifetime.

14. A terminal device for use in a network for providing a real-time stream, the device comprising:
   a storage for storing at least one key stream information element;
   a security association determiner for determining whether at least one changed field is included among one or more key stream fields when the key stream for updating a security association of the terminal device is received from the server; and
   a security association updater for updating the at least one changed field in key stream information stored in the storage when the at least one changed field is identified in the key stream through the security association determiner.

15. The device of claim 14, wherein the security association updater updates only the at least one changed field in the key stream information stored in the storage when the at least one changed field is identified in the key stream through the security association determiner.

16. The device of claim 14, wherein the security association updater sequentially updates the key stream information stored in the storage.

17. The device of claim 16, wherein the storage stores three key stream information elements.

18. The device of claim 14, wherein the key stream is received in one or more User Datagram Protocol (UDP) packets.

19. The device of claim 14, wherein the at least one changed field comprises at least one of a security_parameter_index, a next_security_parameter_index, an encrypted_traffic_key_material_length, an encrypted_traffic_key_material, and a traffic_key_lifetime.

20. The system of claim 1, wherein the terminal device only updates a portion of the stored key stream information that corresponds to the identified at least one changed field in the key stream.

* * * * *